United States Patent [19]

Dutcher

[11] 4,337,750
[45] Jul. 6, 1982

[54] ABRASION RESISTANT DIAMOND BLADE
[75] Inventor: Richard E. Dutcher, Lilburn, Ga.
[73] Assignee: Norton Company, Worcester, Mass.
[21] Appl. No.: 195,580
[22] Filed: Oct. 8, 1980
[51] Int. Cl.³ .............................................. B24D 5/06
[52] U.S. Cl. .................................... 125/15; 51/206 R
[58] Field of Search ................ 125/15; 51/206 R, 207

[56] References Cited
U.S. PATENT DOCUMENTS
2,808,044 10/1957 Upper .................................... 125/15

FOREIGN PATENT DOCUMENTS
574338 9/1977 U.S.S.R. ................................ 125/15
709353 1/1980 U.S.S.R. ........................... 51/206 R

Primary Examiner—Harold D. Whitehead
Attorney, Agent, or Firm—Rufus M. Franklin

[57] ABSTRACT

A saw blade having diamond or other abrasive segments bonded to the periphery of a steel center includes segments of a hook shape with a leg extending radially of the saw. Hooks of different length are provided whereby erosion of the blade at the joints between the segments and the steel center is minimized.

2 Claims, 3 Drawing Figures

ABRASION RESISTANT DIAMOND BLADE

FIELD OF THE INVENTION

This invention relates to abrasive blades for the cutting of hard materials. More particularly, it pertains to a segmental abrasive blade of the type in which a plurality of bonded diamond segments are mounted around the circumference of a slotted steel center or support and constitute the abrasive or cutting edge of the device.

BACKGROUND OF THE INVENTION

Abrasive blades of the above-described type have found widespread use for cutting contraction joints in concrete highways, airport runways, and the like, and are also useful in the cutting of numerous other hard materials. Improvements in the life expectancy of the abrasive segments have advanced the normal period of usefulness of the abrasive segments to the point where the life of the abrasive segments has exceeded the life of the steel center or support. As a result, failure of the blade frequently occurs because of the wearing through of the steel center just below the place where the abrasive segment is joined to the periphery of the supporting steel center. Consequently, the problem has been presented of finding some ways and means of preventing this premature eroding away of the steel center before the abrasive segments have been completely worn out.

U.S. Pat. No. 2,808,044 discloses the use of "L" shaped or hook shaped segments mounted on the periphery of the steel center to control such erosion. While such solution is helpful in controlling erosion we have found that when the hooks are all of the same lengths, as taught in the prior art, the use of too few hooks does not prevent undercutting, and the use of enough hooks to attempt to prevent such undercutting, results in undercutting below the hook itself.

U.S. Pat. No. 3,128,755, to Benson teaches the use of normal diamond segments on a blade, together with abrasive segments which are deeper than the cutting segments, and which are narrower, in axial width, than the cutting segments.

BRIEF SUMMARY OF THE INVENTION

The present invention resides in the discovery that by using randomly arranged hooks of varying length, undercutting or erosion of the steel is effectively reduced to a minimum. The hooks, if desired may alternately or randomly be faced in opposite directions, to permit rotation of the blade, in use, in either direction. While such opposite arrangement of the hooks is known in the art, its combination with hooks of different lengths is believed to be new.

The hooks when used with un-hooked segments should be of at least 2 different lengths and each should differ from the next closest length by at least 10% its length.

DESCRIPTION OF SPECIFIC EMBODIMENTS OF INVENTION

Figure 1:
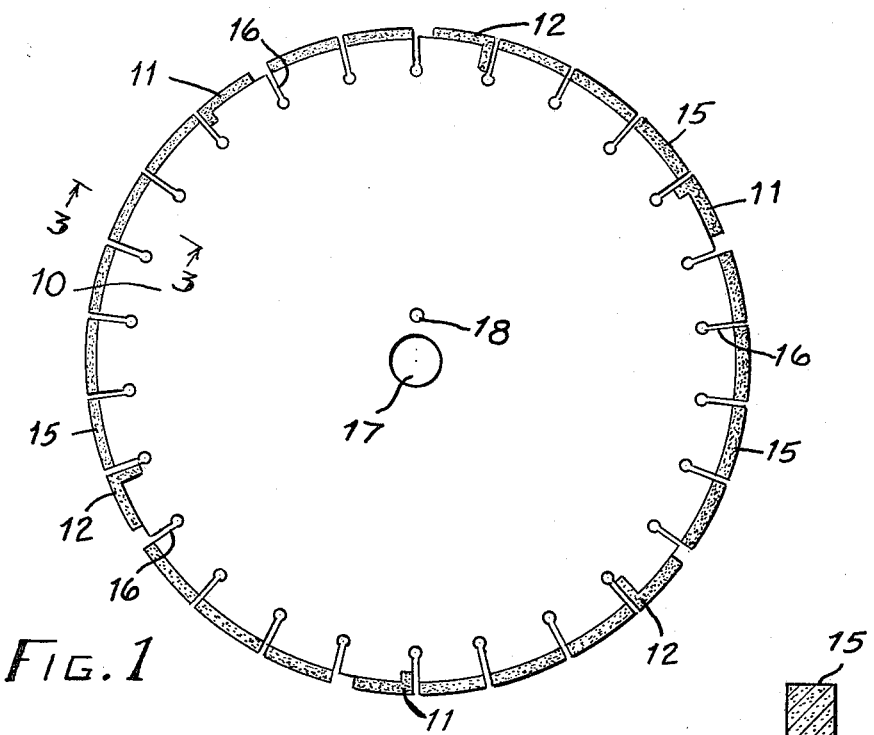
FIG. 1 is a side view of a wheel of the invention.

FIG. 1 shows a cutting blade having a steel center 10, with cutting elements 11, 12, and 15 brazed, welded, or otherwise fastened to the outer periphery of the circular blade 10. The cutting elements 11, 12, and 15 are made of a hard matrix material such as cemented carbides and hard metal or hard metal alloys, with or without carbide (e.g. tungsten carbide) inclusions, in which diamond abrasive grits are bonded. Other abrasives such as cubic boron nitride may be substituted for all or part of the diamond. Silicon carbide abrasive may also be included. The cutting elements are compounded and formed separately as is well known in the art, and then bonded to the steel center by brazing or by welding (e.g. by laser or electron beam).

The cutting elements 11 in FIG. 1 have a short leg, and face in the counterclockwise direction, as opposed to segments 12 which have longer legs and face in the opposite direction. Gullets 16 are formed between the cutting segments as is conventional in the art, and a center mounting hole 17 is provided.

Figure 2:
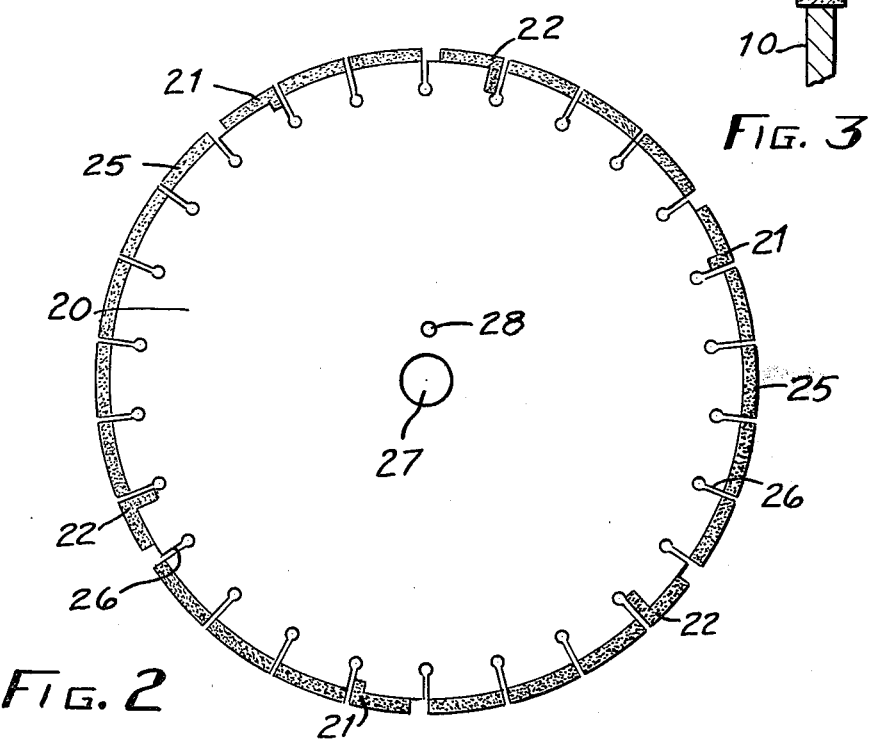
FIG. 2 is a side view of a modified form of the invention.

FIG. 2 is similar to FIG. 1 but shows a blade 20 in which all of the long and short segments 21 and 22 face in the same direction. This modification includes gullets 26 and center hole 27.

Figure 3:
FIG. 3 is a partial sectional view in the direction 3—3 indicated in FIG. 1.

FIG. 3 shows a cross sectional view illustrating the fact that, as is normal in such blades the cutting segments 11 (like 12, 15, 21, and 22) are thicker than the steel center.

The above construction provide a blade with joints between the steel center and the cutting elements at three different radial distances from the center of the blade. One distance provided by the un-hooked segments, and two more provided by the hooked segments having differing leg lengths. If desired, the un-hooked segments could be eliminated and hooked segments of three differing leg lengths could be employed. The preferred construction, however, is that shown in FIG. 1.

What is claimed is:
1. A circular rotary cutting blade having hard abrasive segments, selected from the group consisting of diamond particles, cubic boron nitride particles or diamond and cubic boron nitride particles bonded in a hard metal matrix, bonded to the periphery, and separated by radially extending gullets, wherein at least some of the segments are hook shaped and have a leg extending from one end toward the center of the blade, the improvement comprising the inclusion of segments having leg lengths differing, one from the other, by at least 10%.

2. A blade as in claim 1 also including un-hooked segments.

* * * * *